United States Patent [19]

Yamazaki et al.

[11] Patent Number: 4,679,159

[45] Date of Patent: Jul. 7, 1987

[54] AUTOMATIC ADJUSTMENT METHOD OF TRACER HEAD

[75] Inventors: Etuo Yamazaki, Hachioji; Masashi Yamaguchi, Hino, both of Japan

[73] Assignee: Fanuc Ltd., Minamitsuru, Japan

[21] Appl. No.: 734,278

[22] PCT Filed: Sep. 7, 1984

[86] PCT No.: PCT/JP84/00430

§ 371 Date: May 8, 1985

§ 102(e) Date: May 8, 1985

[87] PCT Pub. No.: WO85/01235

PCT Pub. Date: Mar. 28, 1985

[30] Foreign Application Priority Data

Sep. 9, 1983 [JP] Japan ................................ 58-166370

[51] Int. Cl.$^4$ ....................... G08C 21/00; G05B 15/46
[52] U.S. Cl. ..................... 364/560; 178/18; 364/474
[58] Field of Search ............... 364/560, 474, 475; 178/18-20; 318/569, 572

[56] References Cited

U.S. PATENT DOCUMENTS

| | | | |
|---|---|---|---|
| 4,055,726 | 10/1977 | Turner et al. | 178/18 |
| 4,081,603 | 3/1978 | Davis et al. | 178/19 |
| 4,224,670 | 9/1981 | Yamazaki et al. | 364/474 |
| 4,296,473 | 10/1981 | Imazeki et al. | 364/474 |
| 4,477,877 | 10/1984 | Nakamura et al. | 178/18 |
| 4,492,818 | 1/1985 | Abe | 178/18 |

*Primary Examiner*—Gary Chin
*Assistant Examiner*—Danielle B. Laibowitz
*Attorney, Agent, or Firm*—Staas & Halsey

[57] ABSTRACT

Manual adjustment of a tracer head and adjustment of differential amplifiers for the tracer head are eliminated by a step of storing the outputs of differential amplifier circuits as zero-point offset amounts while maintaining the tracer head in a non-contact state, a step of successively maintaining the tracer head in a first and a second state, and while doing so, storing first and second coordinates of the tracer head in the first and second contact states, together with first and second amounts of displacement compensated for by the zero-point offset amounts, a step of calculating and storing gains of the differential amplifier circuits on the basis of the first and second coordinates and the first and second amounts of displacement compensated for by the zero-point offset amounts, and a step of effecting tracing control through the use of the stored zero-point offset amounts and gains. These steps are carried out under control of a processor.

9 Claims, 3 Drawing Figures

AUTOMATIC ADJUSTMENT METHOD OF TRACER HEAD

BACKGROUND OF THE INVENTION

The present invention relates to an automatic adjustment method of a tracer head for use in a tracing control system.

Heretofore, initial adjustment of a tracer head for use in a tracing control system has been made manually. That is, zero adjustment of the tracer head, held in a non-contact state or out of contact with the surface of a model, is effected so that the output of each differential amplifier circuit for amplifying the output of a differential transformer may be reduced to zero, after which the tracer head is displaced as predetermined and the gain of the differential amplifier circuit is adjusted so that its output may take a predetermined value at this time.

However, this conventional method has the defects of not only involving long-time, complex adjustment but also dispersion in the cutting accuracy since the results of adjustment vary according to different operators.

SUMMARY OF THE INVENTION

An object of the present invention is to provide an automatic tracer head adjustment method which involves no manual operations, and hence increases the cutting speed and accuracy.

The present invention includes a step of storing the output of each differential amplifier circuit as a zero-point offset amount while maintaining the tracer head in the non-contact state; a step of maintaining the tracer head in a first and a second contact state one after the other, and while doing so, storing first and second coordinates of the tracer head in the first and second contact states one after the other, together with first and second amounts of detection compensated for by the zero-point offset amount; a step of calculating and storing the gain of the differential amplifier circuit on the basis of the first and second coordinates and the first and second amounts of detection compensated for by the zero-point offset amount; and a step of calculating an amount of displacement from an amount of detection obtained by A/D converting a signal available from the tracer head through the use of the stored zero-point offset amount and gain under control of a processor.

DESCRIPTION OF PREFERRED EMBODIMENTS

Figure 1:
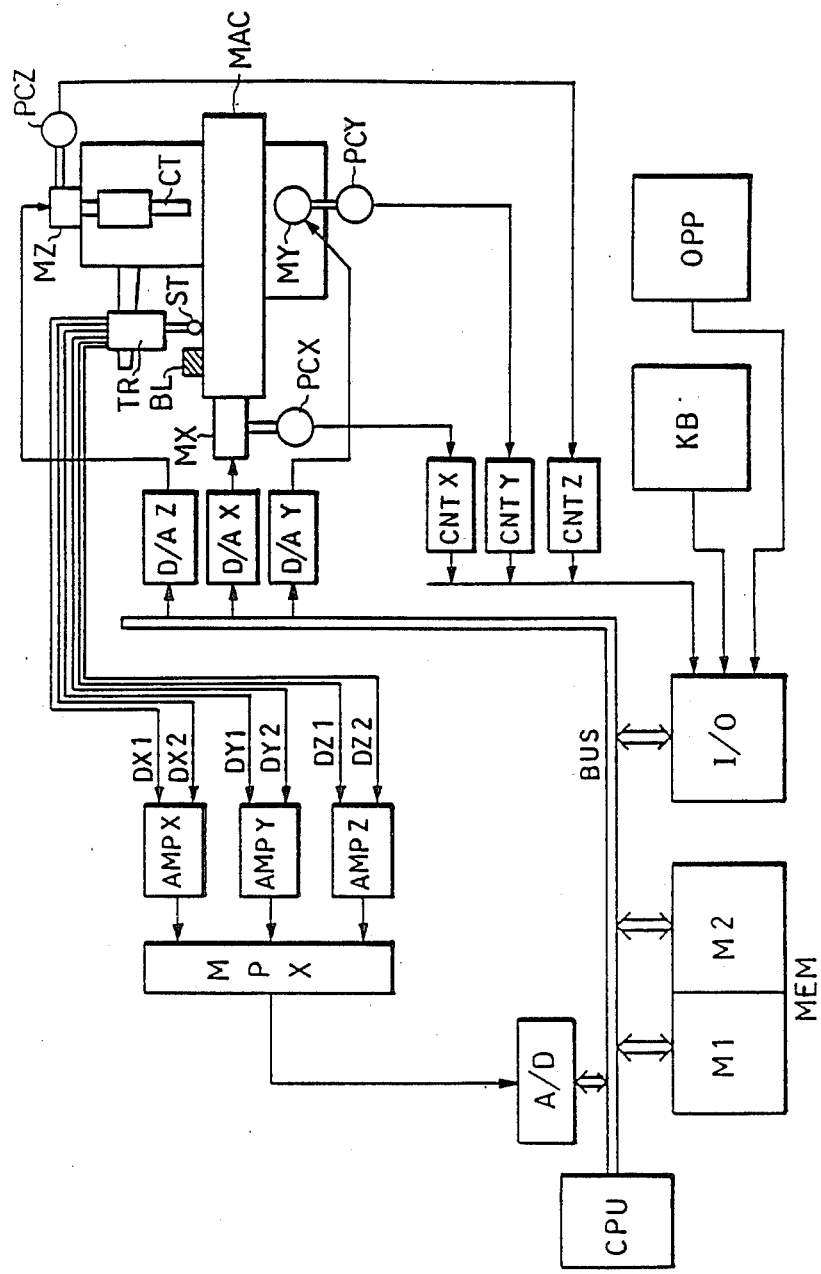
FIG. 1 is a block diagram illustrating the arrangement of a tracing control system to which an embodiment of the present invention is applied.

FIG. 1 illustrates in block form the arrangement of a tracing control system to which an embodiment of the present invention is applied. Reference character TR indicates a tracer head, ST a stylus, CT a cutter, MAC a tracing machine, MX, MY and MZ servo motors in the X-, Y- and Z-axis directions, respectively, PCX, PCY and PCZ position sensors, CNTX, CNTY and CNTZ reversible counters for counting feedback pulses from respective position sensors to indicate the current position of the tracer head, D/AX, D/AY and D/AZ digital-to-analog converters for converting drive signals for the servo motors from digital to analog form, AMPX, AMPY and AMPZ differential amplifier circuits for differentially amplifying displacement signals from differential transformers of the tracer head, MPX a multiplexer for selectively switching the outputs of the differential amplifier circuits, A/D an analog-to-digital converter for converting the output of the multiplexer from analog to digital form, CPU a processor, MEM a memory comprised of a data memory part M1 and a control program part M2, I/O a data input/output device, KB a keyboard and OPP an operator panel.

Figure 2:
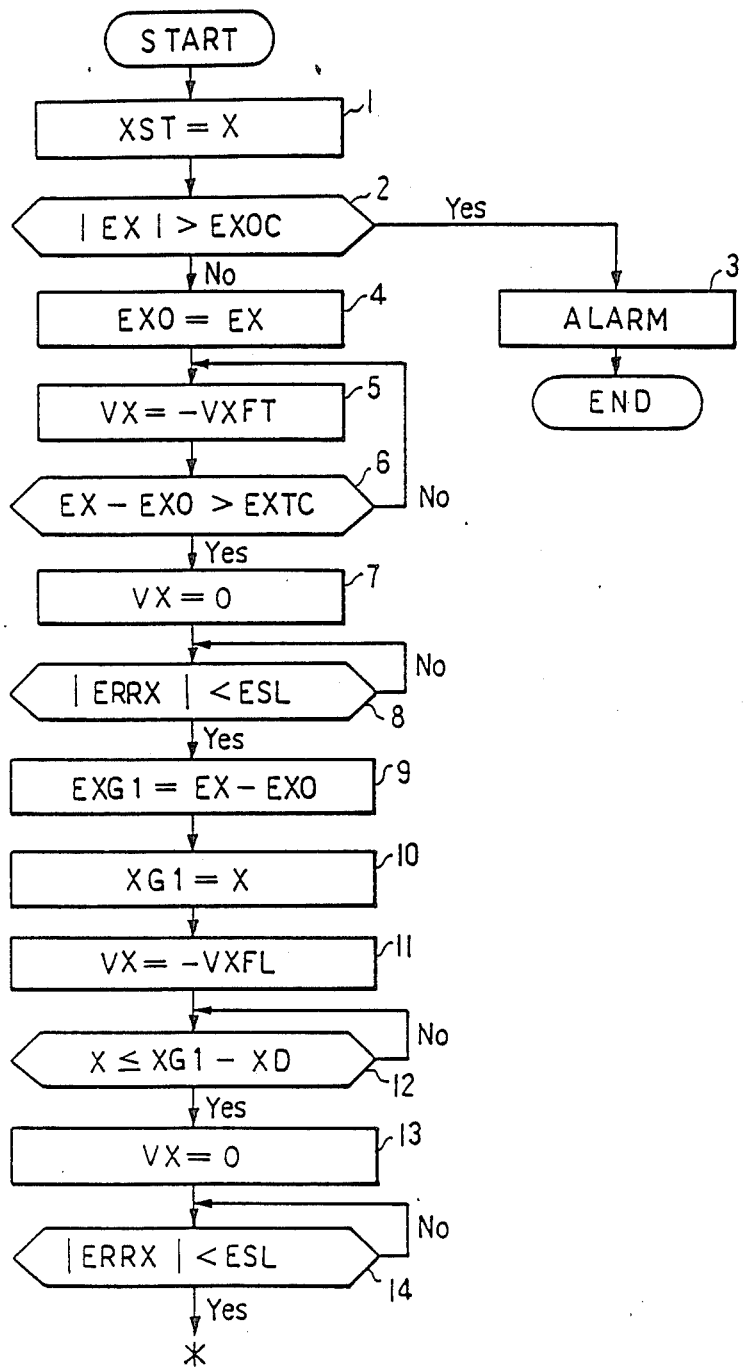
FIGS. 2 and 3 are flowcharts explanatory of the embodiment of the present invention.

The operation of the embodiment of the present invention in FIG. 1 will be described with reference to the flowcharts shown in FIGS. 2 and 3.

The CPU starts its operation at step 1, in which it reads the X-coordinate X of the tracer head at the start of operation from the reversible counter CNTX via a bus BUS and stores it as an X-coordinate XST at the start of operation in the data memory part M1 of the memory MEM. Incidentally, it is the tracing machine MAC that is actually driven by the servo motors and the tracer head stands still, but its coordinates are represented as coordinates relative to the tracing machine MAC.

Next, in step 2 the absolute value of displacement EX in the X-axis direction at the start of operation is compared with a predetermined value EXOC. Since the stylus ST mounted on the tip of the tracer head TR is not in contact with a block BL at the start of operation, the displacement EX at this time naturally ought to be zero, but the displacement EX read out by the CPU via the multiplexer MPX, the A/D converter A/D and the bus BUS does not become zero in general because of inequality between secondary winding outputs DX1 and DX2 of the transformer provided in the stylus which results from positional deviations of iron cores of the transformer, or because of imbalance present in the differential amplifier circuit AMPX. When the displacement EX at the start of operation (when the tracer head is in the non-contact state) is larger than the predetermined value EXOC, since predetermined accuracy of linearity cannot be expected, the operation ends at step 3 raising an alarm. On the other hand, when the displacement EX in the non-contact state is smaller than the predetermined value EXOC, the operation proceeds to step 4 in which the displacement EX is stored as a zero-point offset amount EXO of the differential amplifier circuit AMPX in the data memory part M1.

In the next step 5 the stylus ST is fed at a velocity -VXFT in the X-axis direction (precisely speaking, the tracing machine MAC is fed at a velocity VXFT in the X-axis direction), and in the next step 6 a check is made to determine if the difference between the amount of current displacement EX and the aforementioned offset amount EXO has exceeded a predetermined amount of displacement EXTC. If not, the abovesaid feed and check are repeated until the abovementioned difference exceeds the predetermined amount of displacement. When the stylus moves into contact with the block BL and the difference between the amount of current displacement EX and the offset amount EXO exceeds the predetermined value EXTC, the feed rate VX is changed to zero in step 7, after which it is checked in step 8 whether the movement of the stylus in the X-axis direction has stopped or not. That is, in step 8 a check is made to determine if the content ERRX of an error counter (not shown) for counting the difference between command pulses and feedback pulses from the position sensor PCX has become smaller than a predetermined residual error ESL, and if the result of this checking is affirmative, then it will be decided that the stylus has come to a standstill.

When the stylus has thus been stopped at a first standstill point, the difference between the amount of current displacement EX and the offset amount EXO, that is, the amount of displacement of the stylus at the first standstill position compensated for by the offset amount (the amount of first detection) is stored as EXG1 in the data memory part M1, and in step 10 the X-coordinate X of the first standstill point is stored as XG1 in the data memory part.

Upon completion of this storage, the operation proceeds to steps 11 and 12, in which the stylus is fed toward the block BL at a predetermined velocity -VXFL until the X-coordinate X of the stylus becomes equal to XG1-XD, that is, until the stylus moves further toward the block BL than the abovesaid XG1 by XD. When this condition is fulfilled, the movement of the stylus in the X-axis direction is stopped in steps 13 and 14.

Figure 3:
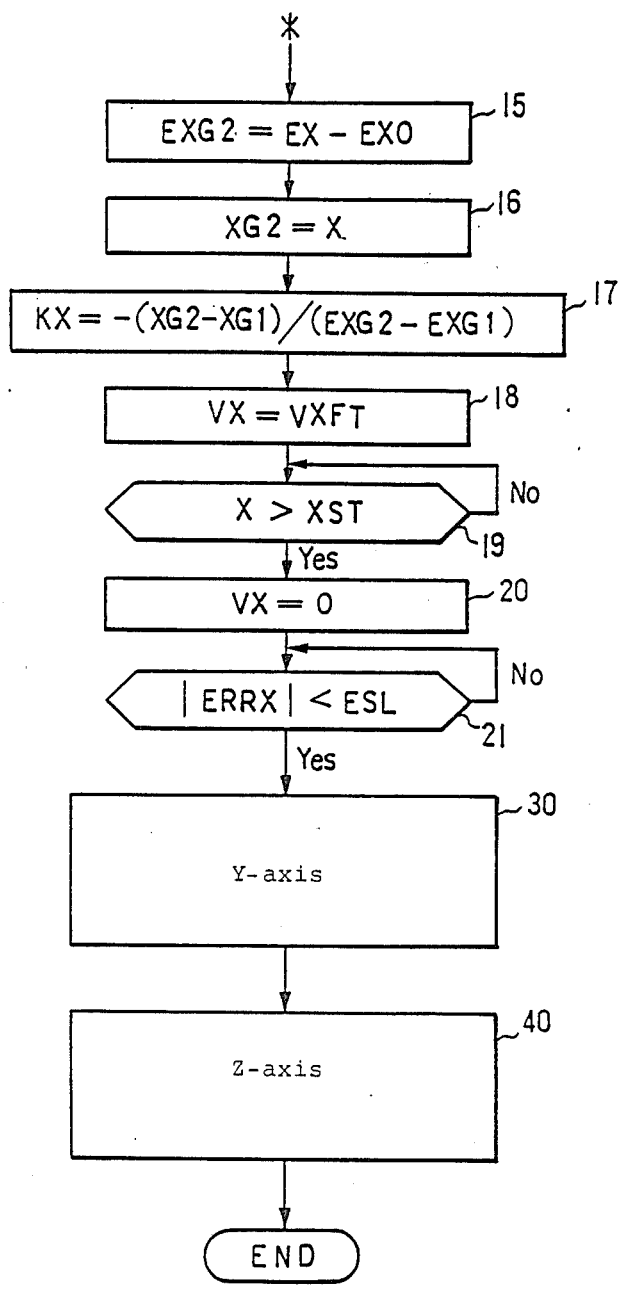

When the stylus has thus been stopped at a second standstill point, the processing by the CPU proceeds to step 15 shown in FIG. 3, in which the difference between the amount of second current displacement EX and the offset amount EXO, that is, the amount of displacement of the stylus at the second standstill point compensated for by the offset amount (the amount of second detection) is stored as EXG2 in the data memory part M1, and in step 16 the X-coordinate x of the second standstill point is stored as XG2 in the data memory part.

Upon completion of this storage, the process by the CPU proceeds to step 17, in which is calculated the ratio of the difference between the X-coordinates of the first and second standstill points, (XG2−XG1), to the difference between the amounts of displacement compensated for by the offset amount, (EXG2−EXG1), and this value with an inverse sign is stored as a gain KX of the differential amplifier circuit AMPX in the data memory part M1.

After the gain KX has been calculated and stored as described above, the stylus is moved toward the operation starting point at a predetermined velocity VXFT in step 18 and, after being returned to the starting point in steps 19, 20 and 21, it is stopped there.

After the zero-point offset amount EXO and the gain KX of the differential amplifier circuit AMPX for detecting displacement of the stylus in the X-axis direction have thus been stored, zero-point offset amounts EYO and EZO and gains KY and KZ of the differential amplifier circuits AMPY and AMPZ for detecting displacement of the stylus in the Y- and Z-axis directions are stored respectively in blocks 30 and 40 of the same contents as the above-described steps 1 to 21, completing the entire process of the CPU.

The zero-point offset amount and gain of the differential amplifier circuit for detecting displacement in each axis, thus stored in the data memory part M1, will be used for zero-point compensation of the amount of displacement in each axis and correction of the gain in the subsequent tracing operation. That is, when starting the subsequent tracing control, the CPU compensates for and corrects output data of the unadjusted differential amplifier circuits AMPX, AMPY and AMPZ on the basis of the zero-point offset amounts and gains stored in the data memory part M1, thus calculating the amounts of displacement. Letting the zero-point offset amounts and the gains of the respective differential amplifier circuits be represented by EXO, EYO, EZO and KX, KY, KZ, the following calculations are conducted for input data EXi, EYi and EZi converted from analog to digital form, thereby obtaining corrected amounts of displacement EX, EY and EZ. EX=KX (EXi−EXO); EY=KY (EYi−EYO); EZ=KZ (EZi−EZO).

While in the above embodiment the zero-point offset amounts and the gains are stored for the three axes while feeding the stylus in the three axes one after another, it is also possible to store the zero-point offset amounts and the gains simultaneously for the three axes while feeding the stylus in a direction including any of the three-axis components.

Further, although in the above embodiment the first standstill point for providing the first contact state is set as the coordinate position where a predetermined amount of displacement is obtained, it is also possible to set the first standstill point by providing predetermined coordinates on the basis of the preknown position and shape of the block BL.

Similarly, the second standstill point can also be set as a point where the amount of displacement is larger than that at the first standstill point by a predetermined amount, instead of setting the second standstill point at a predetermined distance from the first standstill point for providing the second contact state.

Moreover, the first and second contact states are obtained by the first and second standstill points in the above, but it is also possible to obtain the first and second contact states through utilization of the position of the stylus which is moving at a feed rate sufficiently lower than the data read rate and processing throughput of the processor.

As described above in detail, according to the present invention, a step of storing the output of each differential amplifier circuit as a zero-point offset amount while maintaining the tracer head in the non-contact state, a step of successively maintaining the tracer head in first and second contact states, and while doing so, storing first and second coordinates of the tracer head in the first and second contact states, together with first and second amounts of displacement compensated for by the zero-point offset amount, a step of calculating and storing the gain of the differential amplifier circuit on the basis of the first and second coordinates and the first and second amounts of displacement compensated for by the zero-point offset, and a step of performing tracing control using the stored zero-point offset and gain, are carried out under control of a processor without involving any manual operation, thus providing the advantage of increasing the cutting speed and accuracy.

What is claimed is:

1. An automatic tracer head adjustment method for a tracing control system which is provided with a tracer head, differential transformers mounted in the tracer head, differential amplifier circuits for amplifying the difference between secondary winding outputs of the respective differential transformers to detect the amount of displacement of the tracer head, an analog-to-digital converter for converting the detected displacement signal of the tracer head from analog to digital form, coordinate detecting means for detecting the coordinates of the tracer head, a processor for processing the amount of displacement of the tracer head converted to a digital quantity and the coordinates of the tracer head, a memory for storing the processed output of the processor and means for D/A converting a digital quantity for control from the processor to control the feed of the tracer head, said method comprising:

- a step of storing the output of each differential amplifier circuit as a zero-point offset amount while the tracer head is in a non-contact state;
- a step of placing the tracer head in a first contact state, and while doing so, storing a first coordinate of the tracer head and a first amount of detection compensated for by the zero-point offset amount;
- a step of placing the tracer head in a second contact state from the first contact state, and while doing so, storing a second coordinate of the tracer head and a second amount of detection compensated for by the zero-point offset;
- a step of calculating and storing a gain of each differential amplifier circuit on the basis of the first and second coordinates and the first and second amounts of detection compensated for by the zero-point offset amount; and
- a step of calculating the amount of displacement of the tracer head from an amount of detection obtained by A/D converting a signal from the tracer head through the use of each stored zero-point offset amount and each gain under control of the processor.

2. The method of claim 1, wherein said first and second contact states are determined by comparing first and second detection thresholds of said detection to a measured amount of detection compensated for by the zero-point offset amount.

3. The method of claim 1, wherein said first and second contact states are determined by comparing the coordinates of the tracer head to first and second coordinate thresholds.

4. The method of claim 1, wherein said second contact state is determined based on a predetermined value above said first amount of detection compensated for by the zero-point offset with respect to that of said first contact state.

5. The method of claim 1, said tracer control system having three axes, said method comprising storing a zero-point offset amount and a gain for each of said three axes simultaneously while feeding said tracer head in a direction having components along each of said axes.

6. The method of claim 1, said system including a block having a predetermined position and shape which said tracer head can contact, said method comprising determining said first contact state on the basis of said predetermined position and shape of said block.

7. The method of claim 1, wherein said tracer head is maintained in each of said non-contact and first and second contact states during the storing of the respective zero-point offset amount and first and second coordinates and amounts of detection.

8. An automatic tracer head adjustment apparatus for a tracing control system, comprising:

- a tracer head;
- differential transformers mounted in said tracer head;
- differential amplifier circuits, connected to said differential transformers, for amplifying the difference between secondary winding outputs of the respective differential transformers to detect the amount of displacement of said tracer head and produce a detected displacement signal;
- an analog-to-digital converter, connected to said differential amplifier circuits, for converting the detected displacement signal of the tracer head from analog to digital form;
- coordinate detecting means, coupled to said tracer head, for detecting the coordinates of said tracer head;
- a memory for storing a processed output;
- means for D/A converting a digital quantity for controlling the feed of the tracer head; and
- processing means, connected to said analog-to-digital converter, said coordinate detecting means, said means for D/A converting and said memory, for storing the output of each differential amplifier circuit from said analog-to-digital converter as a zero-point offset amount while the tracer head is in a non-contact state, placing the tracer head in a first contact state, and while doing so, storing a first coordinate of the tracer head and a first amount of detection compensated for by the zero-point offset amount, placing the tracer head in a second contact state from the first contact state, and while doing so, storing a second coordinate of the tracer head and a second amount of detection compensated for by the zero-point offset, calculating and storing a gain of each differential amplifier circuit on the basis of first and second coordinates and the first and second amounts of detection compensated for by the zero-point offset amount, and calculating the amount of displacement of the tracer head from an amount of detection obtained by A/D converting a signal from the tracer head through the use of each stored zero-point offset amount and each gain under control of the processor.

9. An apparatus as recited in claim 8, wherein said tracer control system has three axes and said processing means stores a zero offset and a gain for each of said axes while simultaneously controlling the feeding of said tracer head in a direction having components along each of the axes.

* * * * *